United States Patent [19]
Iwata et al.

[11] 3,895,247
[45] July 15, 1975

[54] RECTIFIER UNIT FOR VEHICLE ALTERNATOR
[75] Inventors: Yoriaki Iwata, Toyoake; Noboru Ikoma, Okazaki, both of Japan
[73] Assignee: Nippondenso Co., Ltd., Japan
[22] Filed: Oct. 5, 1973
[21] Appl. No.: 404,112

[30] Foreign Application Priority Data
Oct. 6, 1972  Japan.............................. 47-116554
Oct. 24, 1972  Japan.............................. 47-123360

[52] U.S. Cl. ............................... 310/68 D; 321/8 R
[51] Int. Cl. .............................................. H02k 11/00
[58] Field of Search.......... 310/68 R, 68 D; 321/8 R

[56] References Cited
UNITED STATES PATENTS
3,641,374  2/1972  Sato................................... 310/68 D
3,777,193  12/1973  Buehner............................. 321/8 R
3,789,275  1/1974  Sawano et al...................... 321/8 R
3,812,390  5/1974  Richards............................. 321/8 R OTHER PUBLICATIONS
Suenaga et al., "Rectifier Assembly For Automobile Alternators," Toshiba Review, Nov. 1970, pages 23–27, S1355-0010.

*Primary Examiner*—A. D. Pellinen
*Attorney, Agent, or Firm*—William R. Woodward, Flynn & Frishauf

[57] ABSTRACT

Heat sinks respectively carrying the positive pole pole diodes and negative pole diodes of a three-phase rectifier are assembled with their diodes and with screw studs and the free diode leads are soldered to strips connecting conjugate diodes to which socket contacts are soldered in the middle of the respective strips before the whole assembly is flooded with a resin, pressed and allowed to harden into an integral unit. Leads from the generator windings are soldered into the socket contacts and the rectifier assembly is mounted inside an end-bell of the generator by means of the screw studs of the rectifier unit. In a modified construction a screw stud affixed to the positive heat sink is set in a depression of the heat sink plate and insulated therefrom by a bushing.

3 Claims, 8 Drawing Figures

PATENTED JUL 15 1975　3,895,247

SHEET 1

RECTIFIER UNIT FOR VEHICLE ALTERNATOR

This invention relates to a built-in rectifier unit for an alternating current generator suitable for a motor vehicle.

In the known form of rectifier apparatus of such alternators, the connection between the two heat-sinks on which respectively the positive pole diodes and the negative pole diodes are carried are assembled in the following manner. On a circuit board of insulating material, for example, of a resin, conducting paths are applied, as by being pressed thereon. On a first heat-sink plate the positive pole diodes, and on a second heat-sink plate the negative pole diodes, are soldered on or pressed into position and contact. The free lead wires of the positive and negative pole diodes are inserted into holes of the corresponding conducting paths on the circuit board and soldered thereto. The rectifier assembly thus constructed is then affixed to an end-bell of the generator by means of screws. This type of construction has the disadvantage that the mechanical vibrations arising from operation of the generator can cause fracture of the lead wires, of the diodes, or even of the circuit board.

It is an object of this invention to provide a rectifier assembly for mounting on the end-bell of a generator suitable for automotive use with good resistance and toleration for mechanical vibrations.

SUBJECT MATTER OF THE PRESENT INVENTION

Briefly, the circuit support and the lead wires of the diodes are protected against free vibrations by the bulk of a filling resin. The heat-sink plates serve also as reinforcement elements. The space between the ends of the two heat-sinks, one for the positive pole diodes and the other for the negative pole diodes, is filled with resin, so that an outstanding solidity against bending vibrations and against resonant vibrations of the heat-sink plates individually is obtained. A substantial simplification of assembly is obtained to provide a further advantage, because the integrally formed rectifier unit can be very simply mounted on or in the generator.

Still further advantages are available through the invention. In particular, the resin used for flooding and encasing the assembly can serve also as means for insulating the rectifier unit against the end-bell on which it is mounted. It is particularly effective to take advantage of the resin for also insulating from the heatsink plates the screw studs used for mounting the rectifier unit, so that these screw studs can be at the same potential as the end-bell. In this manner, the number of individual piece parts and the number and complexity of assembly lines for building the generator can be further reduced.

The invention is described by way of illustrative embodiments with reference to the accompanying drawing, in which:

In the various figures and in the corresponding description, the same reference numerals are used for the same or corresponding parts.

FIG. 1 is a diagram of the circuit of a three-phase star-connected generator and its associated rectifier as commonly used in a motor vehicle, shown so that the embodiments of the invention, which incorporate this circuit, may be properly understood. A first embodiment of the invention is shown in FIGS. 2 to 5, inclusive, and a second embodiment in FIGS. 6 - 8.

Figure 1:
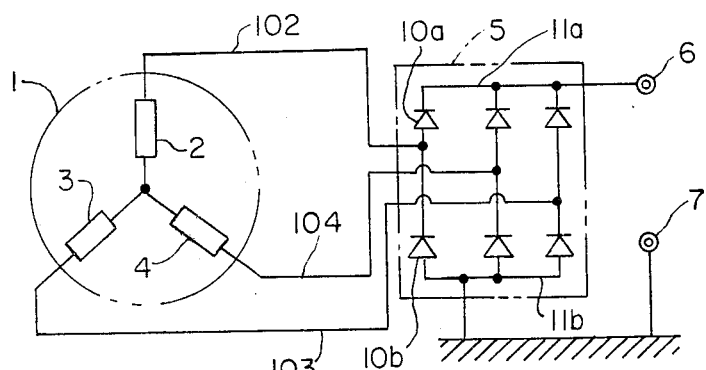
FIG. 1 is an electric circuit diagram of an alternating current generator with a built-in rectifier unit as in the invention.

In FIG. 1, the stator winding 1 of the generator has branches 2, 3 and 4, the outer ends of which are respectively brought out by lead wire 102, 103 and 104. Connected to the stator winding 1 by these lead wires is a rectifier circuit 5 connected on one side to the positive terminal 6 and on the other side to ground, or chassis. A negative terminal 7 is likewise grounded.

Figure 2:
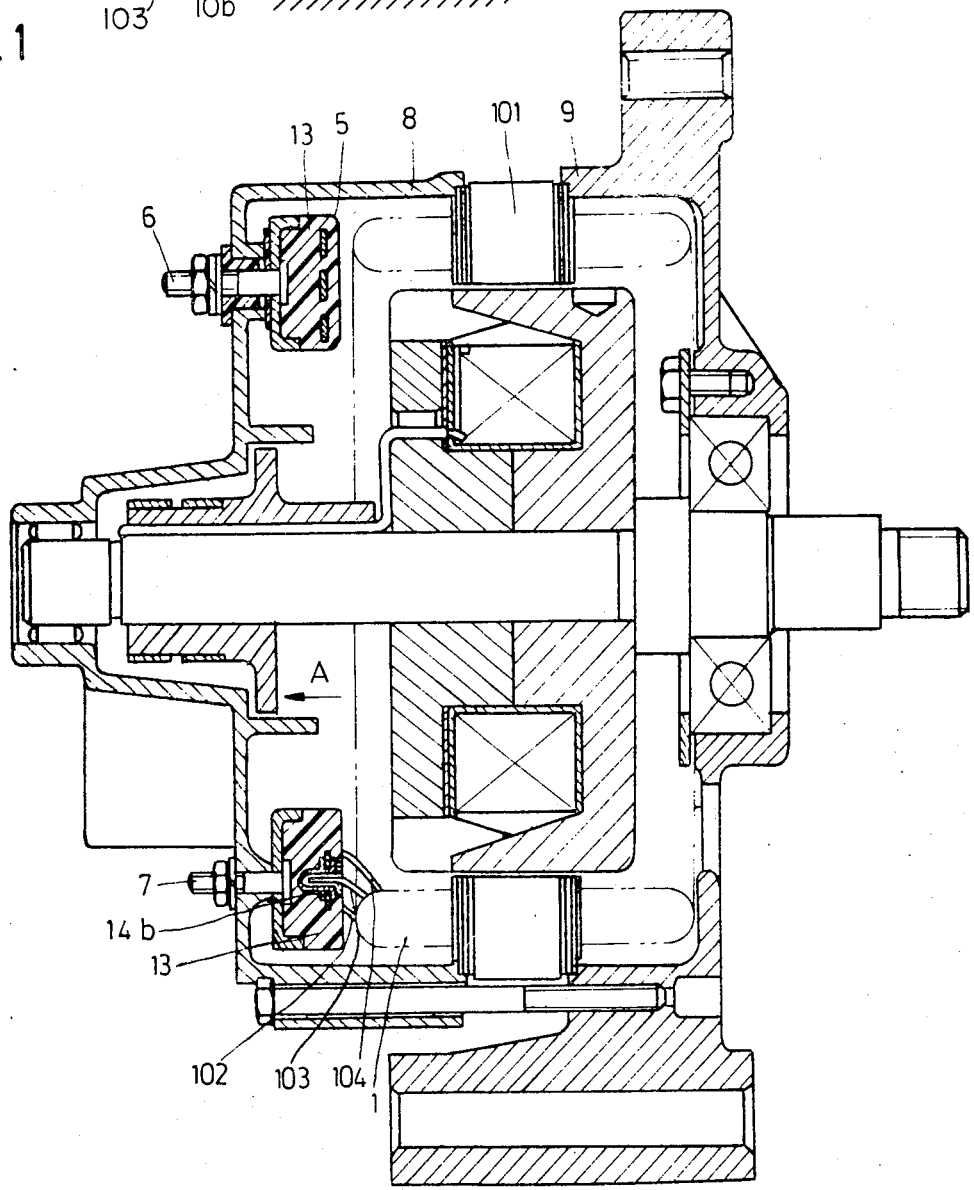
FIG. 2 is a longitudinal cross-section, partly schematic, of a generator provided with a built-in rectifier in accordance with the invention.
Figure 3:
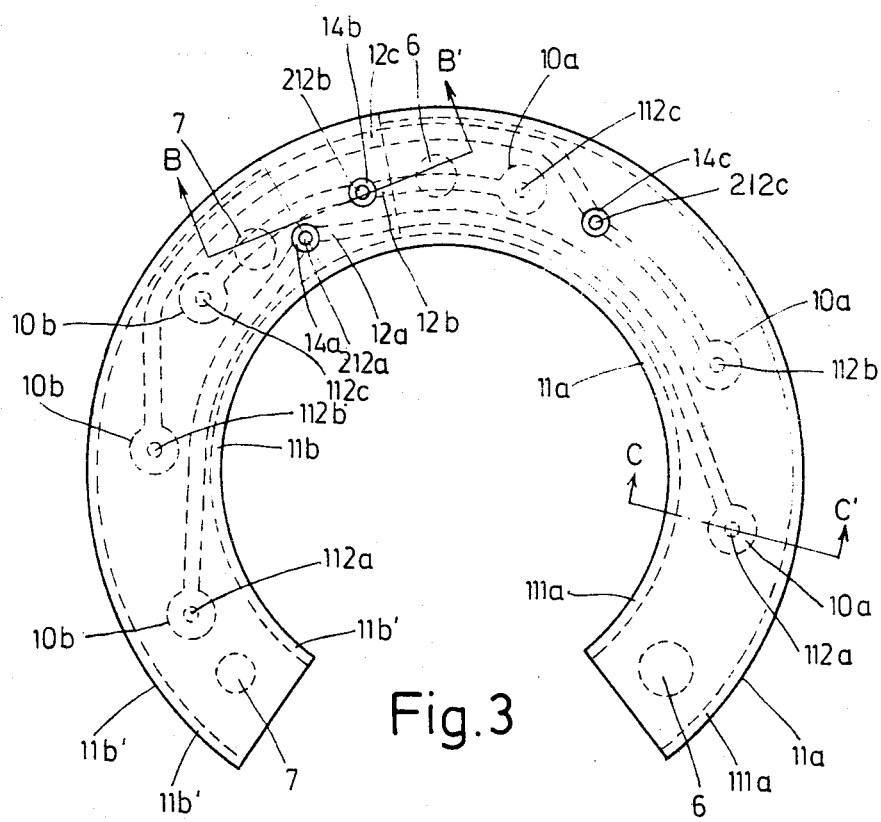
FIG. 3 is a front view of a rectifier unit in a generator in accordance with the invention, as seen in the direction indicated by the arrow A in FIG. 2.
Figure 4:
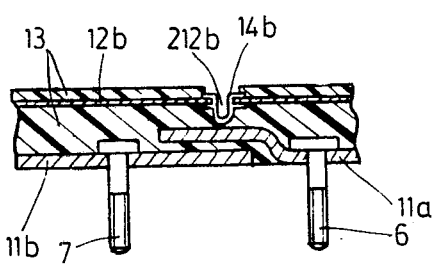
FIG. 4 is a cross-section along the line B - B' of FIG. 3.
Figure 5:
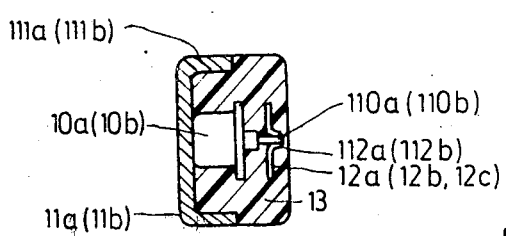
FIG. 5 is a cross-section along the line C - C' of FIG. 3.

FIG. 2 shows the iron core 101 of the stator on which the stator winding 1 mentioned above is wound. The stator core 101 is mounted and held between the two end-bells 8 and 9 which carry the bearings of the generator shaft and provide a casing for the equipment. The rectifier unit 5 consists — as shown in FIGS. 3 to 5 — essentially of three positive pole diodes 10a and three negative pole diodes 10b, a first heat-sink cleat plate 11a for the positive pole diodes, a second heat-sink cleat plate 11b for the negative pole diodes and three conductor strips 12a, and 12c providing the electrical connections to conjugate pairs of the remaining terminals of the diodes 10a and 10b. The rectifier unit is formed and pressed into a single piece with a resin 13. The heat-sink plates 11a and 11b have bent up portions 111a and 111b at the edges. Each of the heat-sink plates 11a and 11b mounts three diodes of the same polarity 10a and 10b, respectively, making electrical contact thereto.

At the two ends of each of the above-mentioned conductor strips 12a, 12b and 12c perforations 112a, 112b and 112c are bored through the strips. The free leads 110a and 110b of the respective diodes 10a and 10b are inserted into these perforations, made fast and electrically connected by soldering. Perforations 212a, 212b and 212c are also provided in the respective midportions of the conducting strips 12a, 12b and 12c and socket contacts 14a, 14b and 14c, which may be in the form of hollow rivets, are affixed at these perforations by riveting and then soldered on. Screw studs 6 and 7 are affixed respectively to the heat-sink plates 11a and 11b by a close fit, these screw studs being identical with the terminals 6 and 7.

The diodes 10a and 10b are first made fast in electrical contact on the heat-sink plates 11a and 11b, respectively. The screw studs 6 and 7 are then inserted and thereafter the conducting strips 12a, 12b and 12c are connected by soldering to the lead wires of the diodes 10a and 10b, connecting them in pairs. Finally, the socket contacts 14a, 14b and 14c are riveted onto the conducting strips 12a, 12b and 12c, respectively. The rectifier assembly thus constructed is then flooded with the resin 13 and pressed to assure thorough filling of the space with the resin. After this molding operation, the resin having hardened, the lead wires 102, 103 and 104 of the stator winding 1 are inserted into the contact sockets 14a, 14b and 14c and soldered fast. The rectifier unit 5 is then affixed to the end-bell 8, using the screws 6 and 7 and interposed insulating bushings and washers not shown in the figure, and then finally, the rest of the generator is completed.

In the first illustrated embodiment of the invention just described, insulating elements are needed in order to insulate the heat-sink plate 11a on which the positive pole diodes 10a are mounted, as well as the screw stud 6 for this heat-sink plate, from the end-bell structure 8. For this purpose, it is necessary to use also insulating caps to prevent short circuits between the nuts of the screw studs 6 sticking out from the surface of the end-bell 8 and the metallic end-bell 8 itself. This means that a few more separate components are needed and that the assembly requires still a few more work positions.

Figure 6:
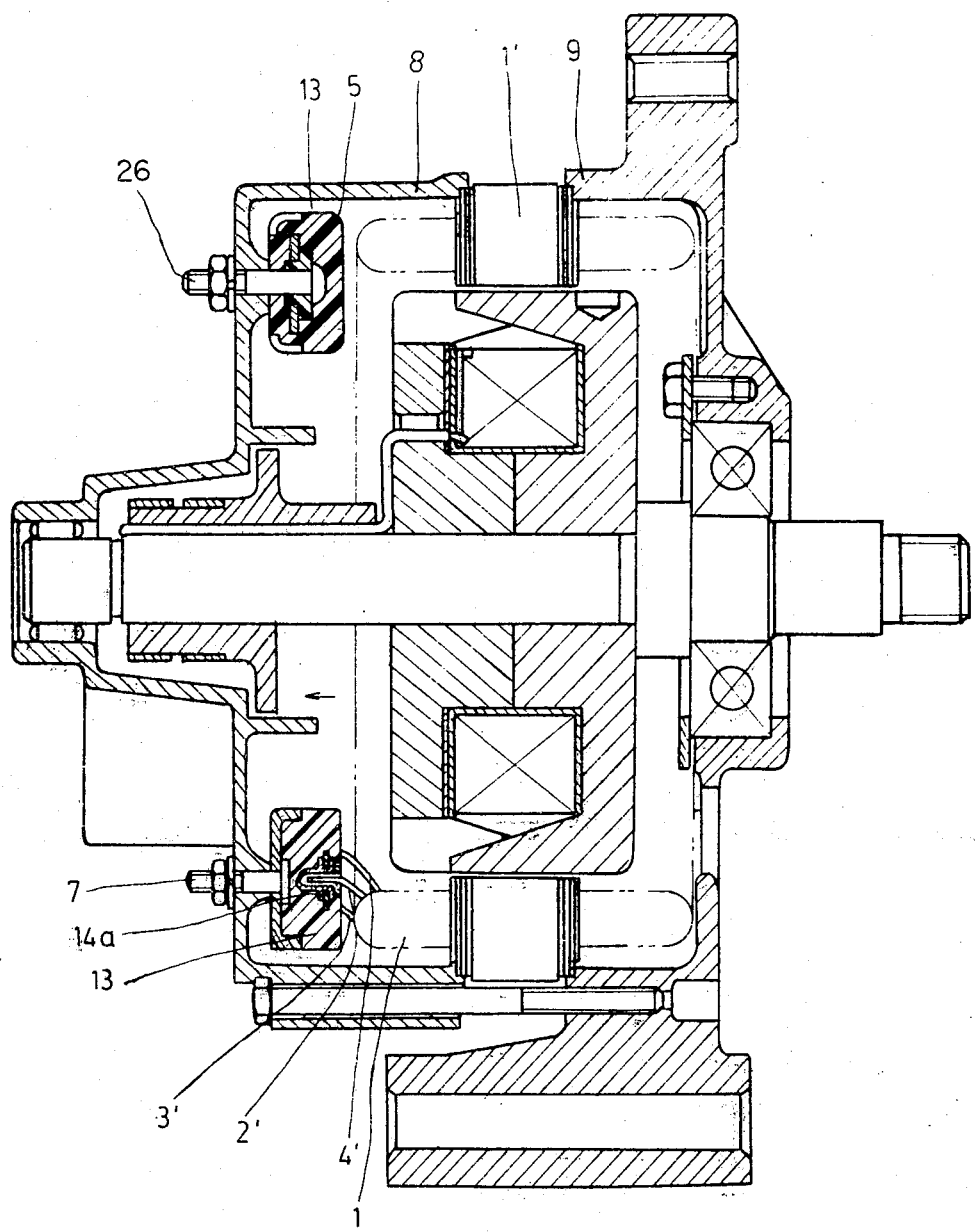
FIG. 6 is a cross-section, partly schematic, of a generator with a built-in rectifier constituting a second embodiment of the invention.
Figure 7:
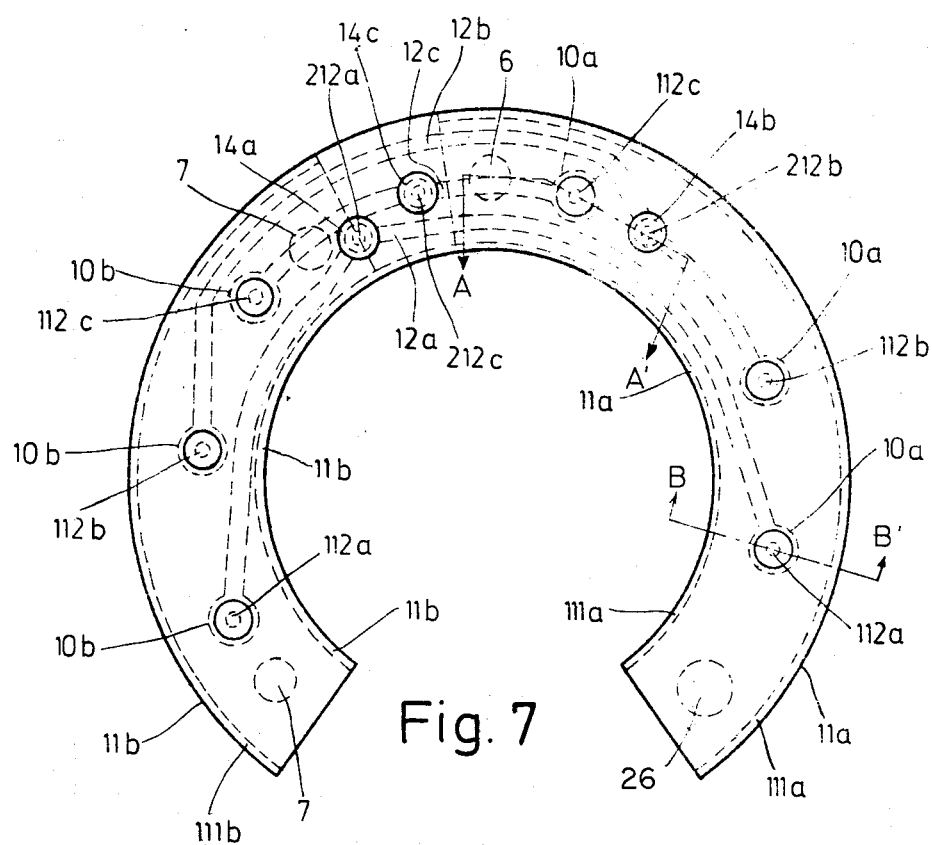
FIG. 7 is an axial view of the rectifier unit of the second embodiment.
Figure 8:
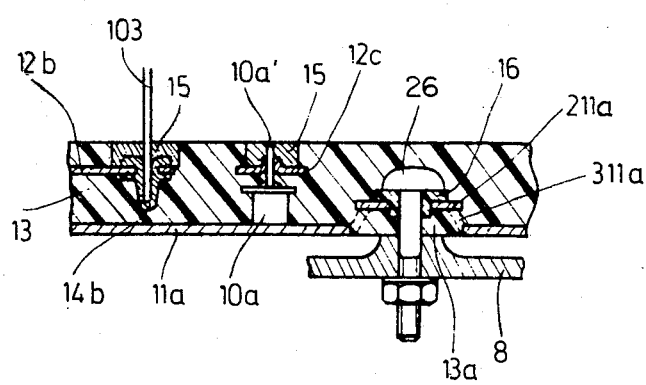
FIG. 8 is a cross-section along the line A - A' of FIG. 7.

This disadvantage is avoided in the second illustrative embodiment here described. Its differences from the first embodiment will now be explained with reference to FIGS. 6 to 8.

The heat-sink plates 11a and 11b are again attached by means of screw studs (26 and 7). In this case, however, the mounting surface on which the integrally constructed rectifier unit 5 is mounted against the end-bell 8 is shaped in a special way. The heat-sink plate 11a, which bears the positive pole diodes 10a, is provided with depressions 211a at the locations of the mounting surfaces. In the center of each depression 211a is a perforation 311a for insertion of the corresponding screw stud 26. Part of the resin 13 is pressed into the depression 211a, this part of the filling resin forming an insulating portion 13a. The screw stud 26 itself is electrically insulated from the edge of the depression 211a by means of an insulating bushing 16.

In the case of the second embodiment of the invention the diodes 10a and 10b are, again, first mounted on the heat-sink plates 11a and 11b, respectively in electrical contact therewith. The screw studs (26 and 7) — the screw stud (26) now insulated by the insulating bushing 16 — are then mounted on the heat-sink plates 11a and 11b. The conducting strips 12a, 12b and 12c are then soldered onto the free connecting leads of the diodes 10a and 10b. Next, the contact sockets 14a, 14b and 14c are fastened by riveting onto the conducting strips (12a, 12b and 12c and then soldered on. Finally, the flooding and pressing with the molding resin 13 is carried out. After this molding operation is complete and the resin hardened, the leads 102, 103 and 104 brought out from the stator winding 1 are inserted into the above-mentioned contact sockets 14a, 14b and 14c, respectively and soldered thereto, after which the rectifier assembly 5 is fastened to the end-bell 8 by means of the screw studs (26 and 7).

Although the invention has been described with respect to particular embodiments, it will be understood that variations and modifications may be made within the inventive concept.

We claim:

1. A rectifier unit for built-in installation in an alternating current generator of a vehicle, said unit having a plurality of positive pole diodes and a plurality of negative pole diodes, and comprising:

a first heat-sink plate on which said positive pole diodes are mounted in electrical contact therewith;

a second heat-sink plate on which said negative pole diodes are mounted in electrical contact therewith, said second heat-sink plate being electrically insulated from said first heat-sink plate and adjacent thereto;

socket contact means for connections to the stator winding of said generator;

conductor means for connecting said socket contact means respectively to said diodes, said positive pole diodes (10a), said negative pole diodes (10b), said socket contact means (14a, 14b, 14c) and said conductor means (12a, 12b, 12d) being embedded in a resin (13) so as to form a single integral component such that the embedding resin exposes no conducting parts other than said heat-sink plates, at least one stud mounted on a heat-sink plate, and said socket contact means to external electrical contacts.

2. A rectifier unit as defined in claim 1, in which said heat-sink plates (11a, 11b) are disposed on the surface of said integral component and flush with said surface.

3. A rectifier unit as defined in claim 2, in which said integral component (5) is mountable on an end-bell (8) of a generator, in which, further, said heat-sink plate (11a) on which said positive pole diodes (10a) are mounted is provided with a depression (211a) substantially filled with said resin (13a), in which, further, said depression (211a) of said heat-sink plate (11a) and the adjacent resin filling thereof (13a) are provided with a perforation (311a) holding a screw stud (26), in which further, the greatest inner diameter of said perforation (211b) is greater than the diameter of a mounting surface on which said integral component (5) is mounted on said end-bell (8), and in which also said screw stud (26) is electrically insulated from the depressed portion (211a) of said heat-sink plate (11a) by insulated bushing means (16).

* * * * *